United States Patent [19]

Appenzeller et al.

[11] 4,172,038
[45] Oct. 23, 1979

[54] FILTER ARRANGEMENT

[75] Inventors: Valentin Appenzeller, Kempen; Werner Hartmann, Krefeld-Forstwald; Johannes Kutz, Toenisvorst, all of Fed. Rep. of Germany

[73] Assignee: Eduard Küsters, Krefeld, Fed. Rep. of Germany

[21] Appl. No.: 873,776

[22] Filed: Jan. 31, 1978

[30] Foreign Application Priority Data

Jan. 5, 1978 [DE] Fed. Rep. of Germany ....... 2800425

[51] Int. Cl.² ............................................. B01D 35/22
[52] U.S. Cl. ................................... 210/332; 210/409; 210/493 R; 210/497 R
[58] Field of Search .................. 210/323 T, 332, 407, 210/409, 413, 493 R, 497 R, 500 M; 55/498, 500, 521

[56] References Cited

U.S. PATENT DOCUMENTS

| 1,669,461 | 5/1928 | Gamble | 210/493 |
| 2,014,105 | 9/1935 | Dooley | 210/493 B |
| 2,577,217 | 12/1951 | Stafford | 210/493 |

Primary Examiner—Frank Sever
Attorney, Agent, or Firm—Kenyon & Kenyon

[57] ABSTRACT

In a tubular filter bodies with at least one tubular filter structure with a porous wall, through which a liquid passes substantially radially, particles above a given size being held back at the entrance surface, made of porous plastic, ceramic material, metal, graphite, etc, continuous operation at constant pressures is made possible by providing at least one groove (or slot) which is closed toward the outside and forms a forced flow path leading from an inlet to an outlet in the circumferential entrance surface of the tubular filter body.

9 Claims, 4 Drawing Figures

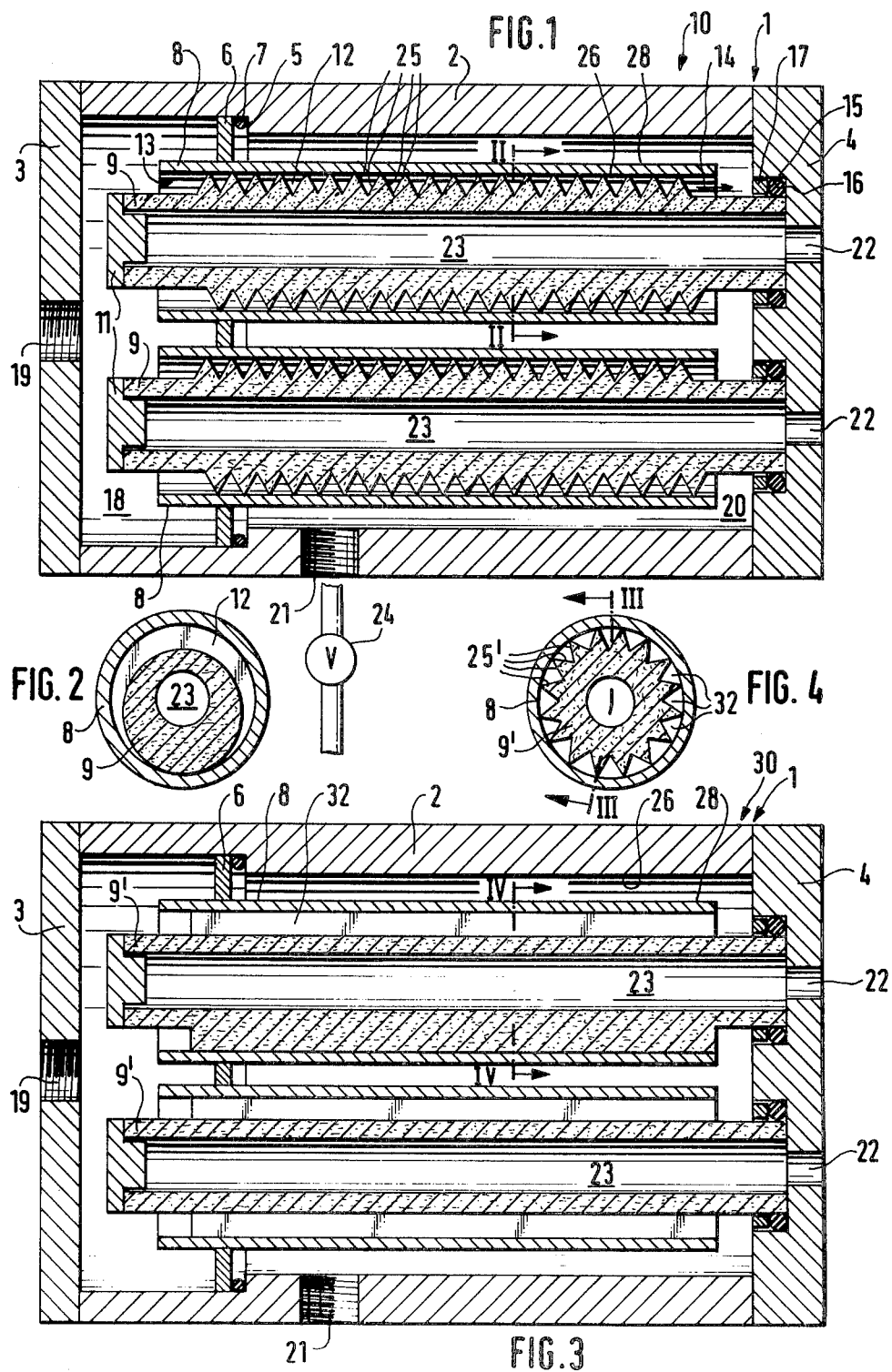

FILTER ARRANGEMENT

BACKGROUND OF THE INVENTION

This invention relates to a filter arrangement in general and more particularly to a filter arrangement with an improved flow path.

Tubular filter bodies with at least one tubular filter structure with a porous wall, through which a liquid passes substantially radially, particles above a given size being held back at the entrance surface, made of porous plastic, ceramic material, metal, graphite, etc. are known. They serve either directly as filter bodies or as supports for a filter diaphragm which has been formed from a liquid phase at the entrance surface of the filter body and permits particularly fine filtration. With diaphragm filtration, mixtures of solvents and dissolved particles can be separated. The separated particles are held back at the surface of the diaphragm.

If the solvent and the dissolved component of the solution to be filtered have approximately the same molecular dimensions, such as is the case, for instance, with rock salt and water, the separating process is called inverse osmosis. As the separating process proceeds against the osmotic pressure, the pressure on the solvent side must exceed the osmotic pressure if filtration is to come about. The necessary pressures can be substantial; a 10% rock salt solution, for instance, has an osmotic pressure of 80 atm, which must be overcome.

If the molecular dimensions differ substantially from each other, one speaks of ultrafiltration. Ultrafiltration finds application for concentrating, fractionating or purifying macromolecular solutions. Because the molecular weight of the dissolved component is high as compared to the solvent, generally higher than 2000, the solutions have only low osmotic pressure, and the separation can be carried out in these cases at relatively low pressures, for instance, at 1 to 10 atm.

The particles to be separated are held back at the surface of the diaphragm. Unless they are transported away by suitable measures, i.e., if, for instance, the liquid to be filtered is substantially stagnant in front of the entrance surface, there is formed in the course of the operation a layer of the separated particles which lowers the permeability of the filter arrangement or increases the pressure that must be supplied. Such a filter arrangement must therfore be cleaned of the layer formed at regular intervals.

SUMMARY OF THE INVENTION

It is an object of the present invention to develop a filter arrangement of the type mentioned at the outset in such a manner that continuous operation at constant pressures is possible.

According to the present invention, this problem is solved by providing at least one groove (or slot) which is closed toward the outside and forms a forced flow path leading from an inlet to an outlet in the circumferential entrance surface of the tubular filter body.

Two things are achieved by the groove or grooves:

First of all, a flow path along the surface, through which the entire quantity of the liquid to be filtered must pass with relatively narrow flow cross sections, is obtained. The liquid to be filtered has an opportunity to make good contact with the entrance surface, which is provided by the walls of the grooves. The liquid to be filtered is in motion everywhere relative to the entrance surface, so that the particles held back there, which have been separated from the filtrate by the material of the filter body, are immediately washed away and remain in suspension or in solution in the concentrate. This effect can be aided by designing the grooves so that the flow becomes as turbulent as possible in order to prevent the formation of laminar boundary layers with practically unmoved zones near the walls at the entrance surface. Thus, the parts of the entrance surface cannot form so-called dead zones, in which separated particles accumulate and form a layer due to lack of removal, nor will substantial portions of the liquid fail to make contact with the entrance surface by remaining inside a stream of liquid with a large cross section.

The other effect of the grooves consists of the enlargement of the entrance surface of a filter body with otherwise the same outside dimensions over a plain cylindrical entrance surface. This is important particularly in the case where the filter body proper supports a filter diaphragm at the entrance surface. This increases the throughput capacity with the input pressure remaining the same. A factor of 2 to 3 is possible for the enlargement of the surface, without being limited to this value.

In principle, the entrance surface can be the inside surface as well as the outside surface of the tubular filter body. The preferred embodiment, however, is the one in which the outside is designed as the entrance surface provided with grooves. This is primarily due to practical reasons in view of the simplified application of the grooves, and also, because a larger surface is basically available on the outside. A more important reason for this preference is, however, that the sintered materials or other porous substances to be considered as material for the filter bodies can take up substantially higher compression stresses than tensile stresses. For the same pressure, a filter body can therefore be made with thinner walls if the pressure is applied from the outside. This lowers the flow resistance and thereby, the power required per unit volume of filtrate.

The grooves can be provided on the tubular filter body axially or helically or also in meander-fashion. The "closed surface" can be provided by the circumference of a tube, which surrounds the tubular filter body in contact therewith if the grooves are provided on the outside of the tubular filter body. Thus, in this case, the closed surface is formed by an outer part which is separate from the filter body.

Since the liquid to be filtered may have to be subjected to considerable pressure in order to press the filtrate through the pores of the diaphragm or the filter body, it is advisable to arrange the tube with the filter body in a pressure housing, in which the pressure of the concentrate acts on the free circumferential surface of the tube.

In this manner, the tube can be partially relieved of pressure, if provision is also made that the concentrate is under pressure. The tube can then be of a lighter design, as it must withstand only the differential pressure between the input pressure and the counterpressure of the concentrate. This differential pressure can be chosen by adjusting the counterpressure accordingly. It is only necessary that it be at least large enough to transport the liquid to be filtered through the grooves of the filter body. While the input pressure that the pressure housing must be able to withstand can be in the order of 100 bar in a practical embodiment, values of only a few bar remain for the differential pressure that the tube must withstand. Enclosing the filter bodies with a tube therefore has as its purpose covering the grooves under high pressure with an element which leaves access for a liquid (concentrate) that is under pressure on the other side, and is thus partially relieved of the high pressure.

A practical embodiment of the invention can be realized in such a manner that the inlet is located at one end of the tube and the outlet at the other end; that a pressure-tight partition, which is sealed against the housing and the tube and compartmentalizes the housing into a first and a second chamber is provided in the pressure housing; and that the inlet of the filter body and the inlet into the pressure housing open into the first chamber and the concentrate outlet of the pressure housing into the second chamber.

Because of the pressure tight partition, the liquid to be filtered cannot flow directly from the inlet of the pressure housing to its outlet, but is forced to take the path along the filter bodies from their inlet to their outlet.

The concentrate outlet of the pressure housing can be followed by a pressure control valve to generate the already mentioned counterpressure, which partially pressure relieves the tubes and also influences the filtering process.

BRIEF DESCRIPTION OF THE DRAWINGS

FIG. 1 is a longitudinal cross section through a so-called module with several filter bodies.

FIG. 2 is a cross section through an individual filter body along the line II—II of FIG. 1.

FIG. 3 is a longitudinal cross section of another embodiment along the line III—III of FIG. 4.

FIG. 4 is a cross section along the line IV—IV of FIG. 3.

DETAILED DESCRIPTION OF THE INVENTION

The filter arrangement 10 of FIG. 1 comprises a pressure housing 1 which includes a tubular part 2 and covers 3 and 4, which are attached at the ends in a pressure tight manner. The tubular part 2 has an internal shoulder 5, against which a partition 6 filling out the cross section of the tubular housing part 2 rests in the axial direction, via a ring seal 7. The partition 6 has cutouts, in which tubes 8 are arranged parallel to the axis of the tube in a pressure tight manner. Two tubes 8 are shown in FIG. 1. The tubes 8 are arranged in the cross section of the housing 1 in such a manner that as many tubes as possible can be accommodated.

In the tubes 8, filter bodies 9, the outside circumference of which rests on the inside circumference 26 of the tubes 8, are arranged. Their outer circumferential surface is the circumferential entrance surface. The filter bodies 9 themselves are tubular and are closed off by plugs 11 at their ends facing the cover 3. At their outer circumference, the filter bodies 9 have a helical groove 12, which forms a helical canal for the liquid between the filter body 9 and the inner circumference of the tube 8. The liquid can enter the canal at the inlet 13 located at the left in FIG. 1 and can leave it again at the outlet 14 located at the right in FIG. 1. The flanks of the groove 12 form the entrance surface 25. At the right end, the filter body 9 protrudes beyond the end of the tube 8 and is sealed in a corresponding recess 15 of the right-hand cover 4 via a circular seal 16, which is pressed into the recess 15 by a pressure ring 17.

The partition 6 divides the interior of the pressure housing 1 into a first chamber 18 which according to FIG. 1 is situated to the left and into which the inlet 19 of the pressure housing leads. The chamber 20 situated to the right in FIG. 1 is in communication with the concentrate outlet 21 of the pressure housing 1. The interior 23 of the tubular filter bodies 9 are in communication with the outside via outlets 22 in the cover 4.

Practically the same pressure prevails in the chamber 20 as in the chamber 18 and in the groove 12. As this pressure acts on the inside surface 26 of the tubes 8 as well as on the free outer circumferential surface 28, the tubes 28 are substantially pressure relieved and can be made accordingly light.

The filter arrangement 10 operates as follows: The liquid to be filtered enters the chamber 18 through the inlet 19 of the pressure housing 1. From there, the liquid to be filtered passes through the inlet 13 into the helical groove 12, moves helically in this groove along the filter body 9 and enters into the chamber 20 at the outlet 14 from the groove. From chamber 20 it is discharged as concentrate from the outlet 21 of the pressure housing 1. The pressure prevailing in the chambers 18 and 20 can be controlled by the pressure control valve 24.

While dwelling in the helical groove 12, part of the liquid to be filtered enters into the interior of the filter body 9 and leaves behind suspended and/or dissolved particles at the entrance surface 25 formed by the outer circumference of the filter body 9, which, however, do not settle down but are carried away immediately by the liquid flowing past surface 25, i.e., the particles remain in the moving concentrate. After traversing the wall of the filter body 9, the filtrate gets into the interior 23 of the filter body and can be drawn off at the outlets 22. The concentrate is returned to the inlet 19 and kept in circulation, if desired, after separation of matter that was taken along, and after combination with fresh liquid to be filtered. In this manner, the filtrate is separated continuously, e.g., as water purified from waste water.

The embodiment of FIGS. 3 and 4 differs from that of FIGS. 1 and 2 only with respect to the design of the filter bodies 9 which have, on their outside, axial slots 32 of, in the illustrated embodiment, approximately triangular cross section. The slots 32 are distributed over the circumference of bodies 9. Instead of the axial slots 32, slots can also be provided which have a slight pitch, which can improve the contact of the liquid to be filtered with the entrance surface 25' of the filter body 9'. Otherwise, the design and operation of the embodiment according to FIGS. 3 and 4 corresponds to that according to FIGS. 1 and 2.

The triangular cross section of the grooves in the illustrated embodiment is not mandatory. Rounded or more rectangular groove cross section can also be considered.

Likewise, the specific development of the filter material and filter body does not matter. This can be a porous filter body which separates particles contained in the liquid to be filtered by means of its pores, but may also be a filter body, having a coherent layer precipitated at its entrance surface on a porous body serving as a carrier, which is a filter diaphragm and constitutes the filter layer proper. Such diaphragms can be used for separating particles down to molecules dissolved in the liquid to be filtered.

One important application of the filter arrangement is the purification of textile treatment waste waters by removal of chemicals such as concentrations and the like, which have considerable molecule size. The filter bodies in such cases consist of graphite or sintered tubes of corrosion resistant steel. They have a diameter of 15 to 25 mm, and are combined in numbers in the order of 30 (the drawing is only schematic in this respect and does not represent the actual conditions) in a common pressure housing to form a so-called module.

What is claimed is:

1. In a filter arrangement with at least one tubular filter body with a porous wall, through which a liquid being filtered passes substantially radially, particles above a given size being held back at the entrance surface thereof and the liquid being filtered passing from the central portion of said filter body to a filtered liquid outlet, the improvement comprising at least one groove in the circumferential entrance surface of the tubular filter body and a cylindrically closed outer surface which rests tightly against the circumferential surface of the tubular filter body, but which is open on both ends closing off said groove on the outside to form a forced flow path leading from a filter body groove inlet at one end of said cylindrical closed outer surface to a filter body groove outlet at the other end of said cylindrical closed outer surface such that a flow path along the surface in said groove, through which the entire quantity of the liquid to be filtered must pass with relatively narrow flow cross sections sized sufficient to assure that the liquid to be filtered is in substantially complete turbulent flow everywhere relative to the entrance surface and further to insure that particles held back at the entrance surface, which particles have been separated from the filtrate by the material of the filter body will be immediately washed away and remain in suspension or solution in the liquid being filtered.

2. The improvement according to claim 1, wherein said grooves run substantially axially to the tubular filter body.

3. The improvement according to claim 1, wherein said grooves run helically on the tubular filter body.

4. The improvement according to claim 1, wherein said grooves run on the tubular filter body in meander fashion.

5. The improvement according to claim 1, wherein said grooves are provided on the outer circumference of the tubular filter body.

6. The improvement according to claim 1, wherein said closed surface comprises a tube.

7. The improvement according to claim 6, and further including a pressure housing having an inlet and an outlet surrounding said tube and filter body, in which housing the pressure of the concentrate acts on the free circumferential surface of the tube.

8. The improvement according to claim 7, and further including a pressure-tight partition in the pressure housing located in the vicinity of the inlet end and sealed to said pressure housing and said tube to compartmentalize the pressure housing into a first and a second chamber; and wherein the inlet of the filter body groove and the inlet into the pressure housing open into the first chamber and the outlet of the filter body groove and the outlet of the pressure housing open into the second chamber.

9. The improvement according to claim 8, and further including a pressure control valve following the outlet of said housing.

* * * * *